United States Patent
Read

(10) Patent No.: US 6,657,563 B2
(45) Date of Patent: Dec. 2, 2003

(54) METHOD AND SYSTEM FOR ENCODER SIGNAL PROCESSING WITH REDUCED ROUTING

(75) Inventor: Christopher Jensen Read, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 10/113,442

(22) Filed: Mar. 29, 2002

(65) Prior Publication Data

US 2002/0175838 A1 Nov. 28, 2002

Related U.S. Application Data

(60) Provisional application No. 60/293,032, filed on May 23, 2001.

(51) Int. Cl.[7] .................................................. H03M 7/30
(52) U.S. Cl. ............................ 341/50; 341/51; 341/155; 341/110
(58) Field of Search ........................... 341/50, 155, 110, 341/122, 51

(56) References Cited

U.S. PATENT DOCUMENTS

| | | | | |
|---|---|---|---|---|
| 4,774,496 A | * | 9/1988 | Tomasevich | 341/50 |
| 5,134,396 A | * | 7/1992 | Sirat et al. | 341/51 |
| 5,229,767 A | * | 7/1993 | Winter et al. | 341/50 |
| 5,313,203 A | * | 5/1994 | Suu et al. | 341/50 |
| 5,455,576 A | * | 10/1995 | Clark et al. | 341/50 |
| 5,619,197 A | * | 4/1997 | Nakamura | 341/50 |
| 5,805,086 A | * | 9/1998 | Brown et al. | 341/51 |
| 5,912,636 A | * | 6/1999 | Gormish et al. | 341/50 |
| 5,929,791 A | * | 7/1999 | Masenas | 341/51 |
| 6,492,916 B1 | * | 12/2002 | Schwartz et al. | 341/50 |

* cited by examiner

Primary Examiner—Michael Tokar
Assistant Examiner—Lam T Mai
(74) Attorney, Agent, or Firm—Thomas F. Lebens; Fitch, Even, Tabin & Flannery

(57) ABSTRACT

An apparatus and method for providing an encoded signal with an encoder. The encoder includes an encoding stage and a selection stage. The encoder receives a first external encoded signal, a first external unencoded signal and an external selection signal. The encoding stage encodes the first external unencoded signal to generate a first internal encoded signal. The selection stage internally routes within the encoder one of the first external encoded signal and the first internal encoded signal to an output of the encoder in response to the external selection signal.

16 Claims, 6 Drawing Sheets

METHOD AND SYSTEM FOR ENCODER SIGNAL PROCESSING WITH REDUCED ROUTING

CROSS-REFERENCE TO RELATED APPLICATION

This application claims priority under 35 U.S.C. 119(e) to U.S. Provisional Patent Application No. 60/293,032, filed May 23, 2001, of Christopher J. Read, for METHOD AND SYSTEM FOR REDUCING ROUTING OF HIGH SPEED TRANSPORT STREAMS WITH AN MPEG ENCODER, which U.S. Provisional Patent Application is hereby fully incorporated herein by reference.

BACKGROUND

1. Field of the Invention

The present invention relates generally to signal processing, and more specifically to signal encoding.

2. Discussion of the Related Art

Previous digital video systems utilize encoding of binary video and audio data for communicating the data. These previous systems utilized dedicated communication paths for this encoded information to avoid having to utilize the CPU bus of the system and degrade the performance of both the CPU and the speed of the communication.

However, these previous systems are becoming more complex, utilizing increasing numbers of dedicated path for the communication of encoded data. The increased numbers of dedicated paths cause an increased complexity to the system design and routing of the communications. This increased complexity and routing often requires additional circuitry and causes an increase in the cost of designing and assembling the system.

SUMMARY OF THE INVENTION

The present invention advantageously addresses the needs above as well as other needs through a method and apparatus for signal processing. The present method and apparatus provide for an encoded signal with an encoder receiving a first external encoded signal with the encoder; receiving a first external unencoded signal with the encoder; receiving an external selection signal with the encoder; encoding the first external unencoded signal with the encoder to generate a first internal encoded signal; and internally routing within the encoder one of the first external encoded signal and the first internal encoded signal to an output of the encoder in response to the external selection signal.

The method and apparatus further provide for an encoder having a first input configured to receive a first external encoded signal; a second input configured to receive a first external unencoded signal; a selection input configured to receive an external selection signal; an encoding stage configured to encode the first external unencoded signal to generate a first internal encoded signal; and a selection stage responsive to the external selection signal, wherein the selection stage is configured to internally route within the encoder one of the first external encoded signal and the first internal encoded signal to an output of the encoder.

The method and apparatus further provide for an encoder having a first input configured to receive a first external encoded signal; a second input configured to receive a first external unencoded signal; a selection input configured to receive an external selection signal; means for encoding the first external unencoded signal to generate a first internal encoded signal; and means responsive to the external selection signal for internally routing within the encoder one of the first external encoded signal and the first internal encoded signal to an output of the encoder.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION

Figure 1:
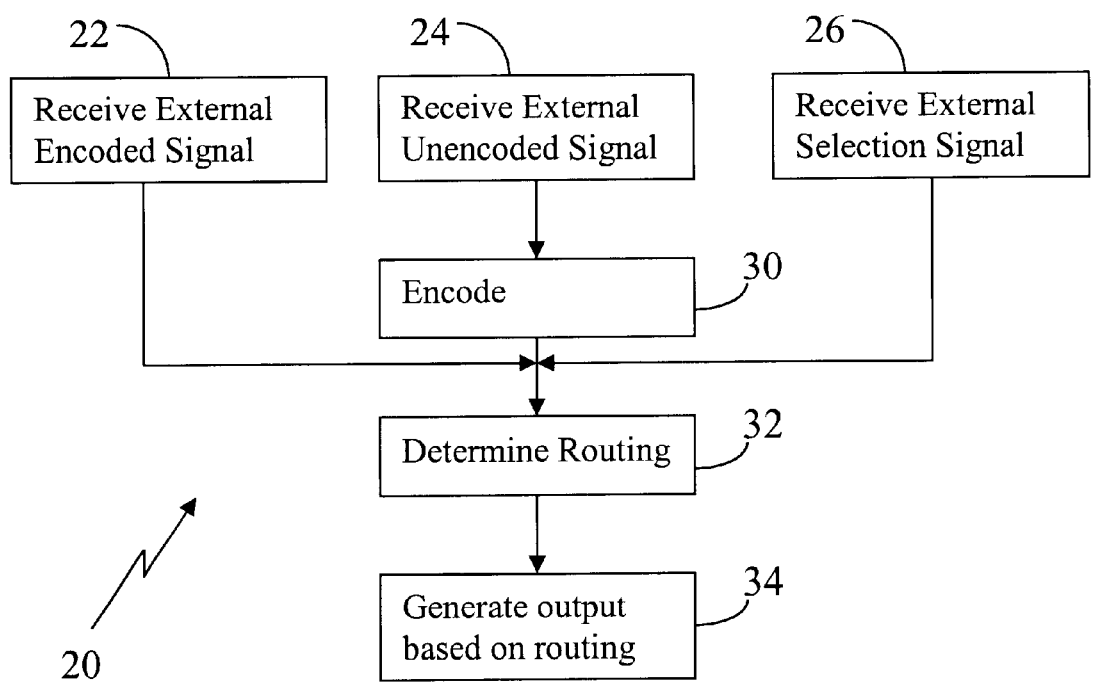
FIG. 1 depicts a simplified flow diagram of a process for providing one or more encoded signals according to one embodiment of the present invention.

The following description is not to be taken in a limiting sense, but is made merely for the purpose of describing the general principles of the invention. The scope of the invention should be determined with reference to the claims.

Digital data and information are often configured or formatted to optimize the amount of information that can be stored, communicated and/or utilized. The formatting of the digital data can be configured to reduce the number of bits needed to store, communicate and/or utilize the data accurately. For example, the number of bits can be reduced by reducing redundancies. One example of a format used to reduce and conserve the number of bits is bit compression. Another format is the moving pictures experts group (MPEG) format (including MPEG-1, -2,-4 and the like). MPEG provides coding of digital data to reduce the number of bits needed to accurately store, communicate and utilize the data. The data can include substantially any data, communication, and information including, graphics, audio, video, text, images, and substantially any other data and/or information capable of being digitally represented.

Digital systems, such as digital video systems and those systems that use the MPEG standards for coding of data, commonly use a transport stream (TS) format for storing and transmitting the digital data. For example, the transport stream format is a standard capable of carry the information needed to reconstruct a movie, television program, videos, images and other such data. A transport stream can carry data from one or more programs and/or applications. For example, a single transport stream can include data for two different movies and data for five different television programs. Earlier digital video systems, such as set top boxes or digital televisions, employed a single front end that decoded the modulated transport stream, which was then sent to the MPEG 2 decoder where the desired program was decoded. This was a simple architecture, and one that utilized a dedicated path for the transport stream to use, keeping the high-speed, real-time transport stream off the CPE bus in the system.

Previous digital video systems have become increasingly more sophisticated. There is a great proliferation of the number of transport streams that must be handled in current digital systems, for example, a digital video system. Previous systems have attempted to flexibly communicate transport stream data from any source to any destination. Routing these streams within the system has become a serious problem. The higher the number of transport streams, the higher the number of dedicated paths, the greater the number and length of the wires or communication paths needed to carry the transport streams. Further, the higher the collection of paths and the higher the frequency of the data being carried through the wires means a higher amount of digital noise that the system will emit.

The MPEG 2 encoder is an example of a source of transport stream data. The MPEG 2 encoder receives an uncompressed analog or digital signal, compresses it, and encodes it into the transport stream format. The encoder is a source for data transport streams, and provides an additional stream in which systems have to incorporate, communicate and route.

FIG. 1 depicts a simplified flow diagram of a process 20 for providing one or more encoded signals according to one embodiment of the present invention. In step 22, an external encoded signal is received. In step 24, an external unencoded signal is received. In step 26, an external selection signal is received. In step 30, the external unencoded signal is encoded to generate an internal encoded signal. In step 32, routing of the external encoded signal and the internal encoded signal is determined based on the selection signal. In step 34, an output signal is generated based on the determined routing.

Figure 2:
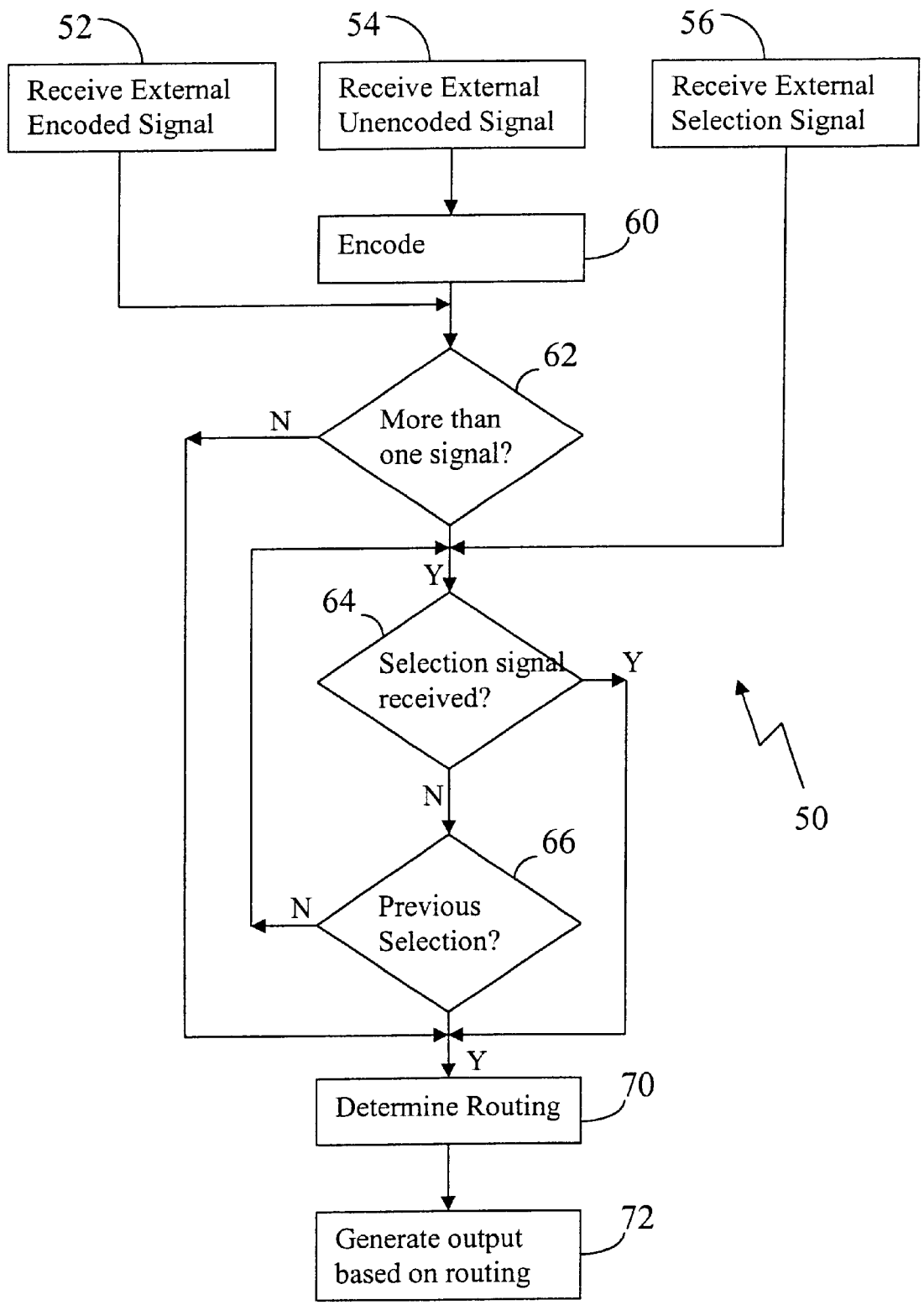
FIG. 2 depicts a simplified flow diagram of a process for providing one or more encoded signals according to one embodiment of the present invention.

FIG. 2 depicts a simplified flow diagram of a process 50 for providing one or more encoded signals according to one embodiment of the present invention. In step 52, an external encoded signal is received. In step 54, an external unencoded signal is received. In step 56, an external selection signal is received. In step 60, the encoder encodes the external unencoded signal to generate an internal encoded signal. In step 62, it is determined if more than one data signal is being received. For example, the process 50 determines if both an external encoded signal and an internal encoded signal are received. If only one signal is received, the process 50 proceeds to step 68, described below. If more than one data signal is received, the process proceeds to step 64, where it is determined if the selection signal has been received. If not, the process proceeds to step 66, where it is determined if a previous selection was received and is still valid. If a previous selection signal has not been received or is not valid, the process returns to step 64 to await a selection signal. If a selection signal was received in step 64 or a previous selection signal is determined to still be valid in step 66, the process proceeds to step 68 where routing of the external encoded signal and the internal encoded signal is determined based on the selection signal. In step 70, an output signal is generated according to the determined routing.

Figure 3:
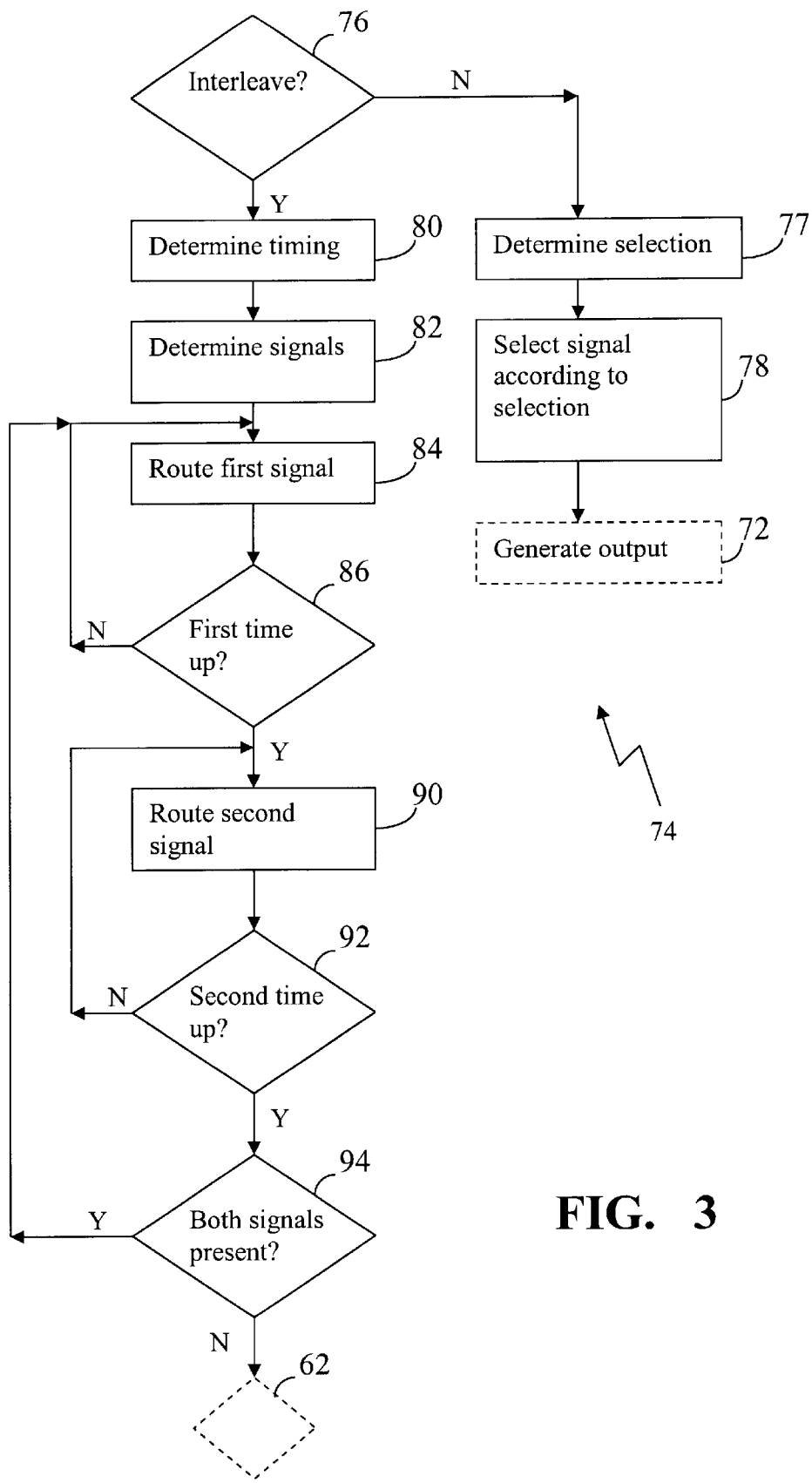
FIG. 3 depicts a simplified flow diagram of one implementation of a process for determining routing.

FIG. 3 depicts a simplified flow diagram of one implementation of a process 74 for determining routing according to steps 34 and/or 70 of FIGS. 1 and 2, respectively. In step 76, the process 74 determines if two or more signals are to be interleaved based on the selection signal. If not, the process proceeds to step 77 where the single signal selection is determined (e.g., only the internal encoded signal) according to the selection signal. In step 78, the single signal is selected as dictated by the selection signal 36. Following step 78, the process returns to the processes depicted in FIGS. 1 and 2 to generate the output based on the single selected signal (e.g., step 72). If, in step 76, it is determined that two or more signals are to be interleaved, the process proceeds to step 80 where timing of the interleaving is determined. In step 82, the process 74 determines which of the plurality of signals to be interleaved is to be routed first. For example, the external encoded signal may be determined as the signal to be routed first in the interleaving of the plurality of signals. In step 84, the signal to be routed first is routed to the output. In step 86, it is determined if a predetermined amount of the first signal (e.g., the external encoded signal) has been routed. In one embodiment, this is determined based on a predetermined time period. If the time period has not been exhausted, the process 74 returns to step 84 to continue to route the portion of the first signal.

If, in step 86, the time period for routing the first signal has expired, step 90 is entered where the second signal to be interleaved (e.g., the internal encoded signal) is routed to the output. In step 92, it is determined if the time period for routing the portion of the second signal to be interleaved has been exhausted. If not, the process returns to step 90 to continue routing the second signal. If, in step 92, the time period has been exhausted, the process continues to step 94 where it is determined if more than one signal still remains to be interleaved. If there is more than one signal to be interleaved, the process 74 returns to step 84 to route another portion of the first signal to be interleaved. If it is determined in step 94 that only one signal remains to be routed, and all other signals have been outputted, the process 74 returns to step 62 (see FIG. 2) for continued encoding. The process just described provides interleaved routing of two data signal; however, it will be apparent to one skilled in the art that any number of signals can be interleaved following similar steps.

Figure 4:
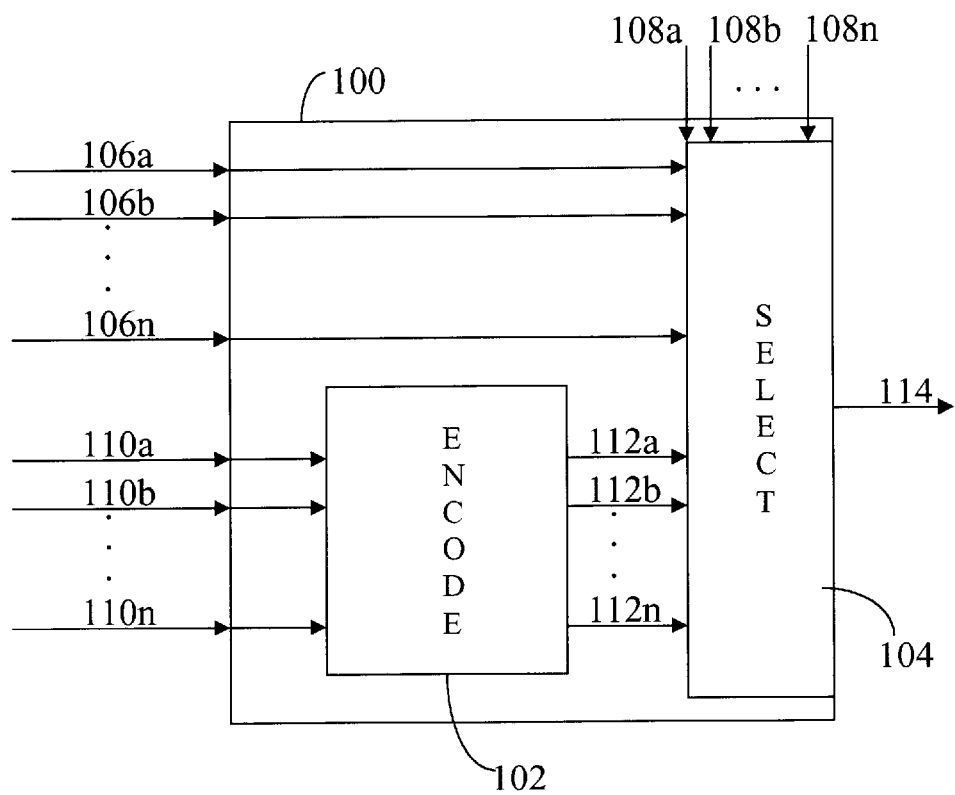
FIG. 4 depicts a simplified block diagram of an encoder according to one embodiment of the present invention.

FIG. 4 depicts a simplified block diagram of an encoder 100 according to one embodiment of the present invention. The encoder includes an encoding stage 102 and a selection stage 104. The encoder 100 receives one or more external encoded signals 106a–n. The external encoded signals can have substantially any encoding format. The encoder 100 further receives one or more external unencoded signals 110a–n. The unencoded signals 110a–n are directed to the encoding stage 102. The encoding stage is configured to encode the one or more external unencoded signals 110a–n to produce internal encoded signals 112a–n. The external encoded signals 106a–n and the internal encoded signals 112a–n are forwarded to the selection stage 104.

The selection stage 104 is configured to route one or more of the external encoded signals 106 and/or one or more internal encoded signals 112 to be outputted as an output signal 114 of the encoder 100 based on control instructions provided by the encoder 100 or other external control (not shown). In one embodiment, the encoder additionally receives one or more external selection signals 108a–n. The selection signals 108 provide the control or direction to the selection stage 104 in determining routing of the data signals 106, 112. The selection signal 108 can direct the selection stage 104 to select one of the external encoded signals 106 or one of the internal encoded signals 112 and forward that one signal out as the output signal 114. Alternatively, the selection stage 104 can be directed to interleave two or more of the external and/or internal encoded signals to generate the output signal 114.

The encoding of a signal is well known in the art and the encoding stage 102 can be implemented through substantially any type of means for encoding. The encoding format of the external and internal encoded signals 106 and 112, respectively, can be substantially any format such as MPEG, national television standards committee (NTSC) format, RealAudio, encryption, or substantially any other format. In one embodiment, the encoding format is an MPEG format, where the external encoded signals 106a–n are provided in a transport stream, and the external unencoded signals 110a–n are encoded through the encoder stage 102 into an MPEG format providing the internal encoded signals 112a–n.

In one embodiment, the encoder 100 is implemented through an MPEG 2 encoder that is configured to receive at a first input, an external encoded signal 106, such as an MPEG 2 transport stream, and receive at a second input, an unencoded and uncompressed signal 110, such as an uncompressed video signal. The encoder stage 102 encodes the unencoded and uncompressed signal 110 to produce an internal encoded signal 112 based on the unencoded signal.

A selection input receives the selection signal 108. The selection stage 104 is configured to select between the external signal 106 and the internal signal 112 as dictated by the selection signal 108. By way of example, in one embodiment, the selection stage 104 may be implemented through a multiplexer. The multiplexer receives each of the external encoded signals 106 and the internal encoded signals 112. The multiplexer routes one of the signals or interleaves a plurality of the signals and routes the interleaved signals out as the output signal 114.

Figure 5:
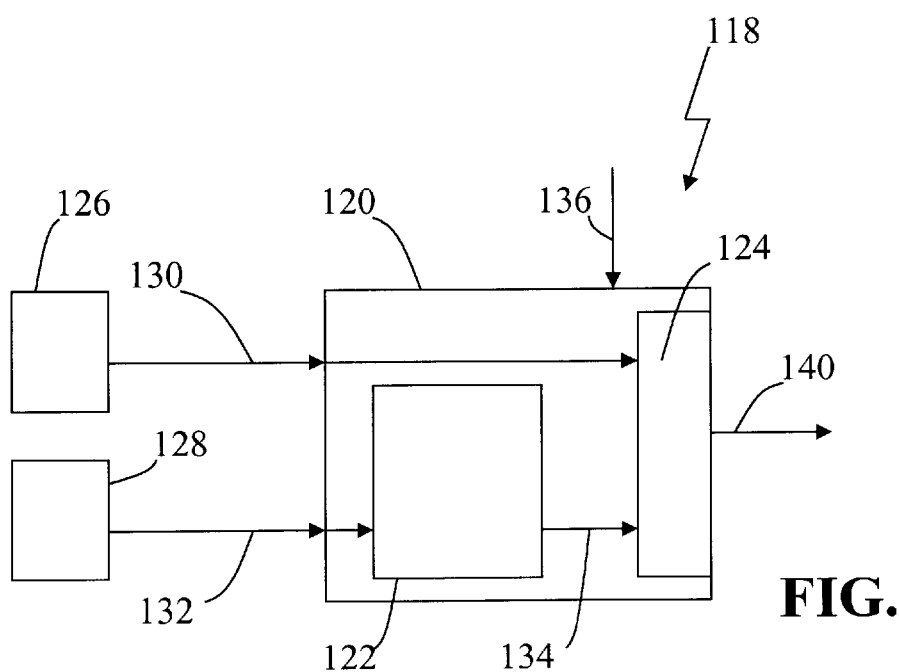
FIG. 5 depicts a simplified block diagram of a system incorporating an encoder according to one embodiment of the present invention.

FIG. 5 depicts a simplified block diagram of a system 118 incorporating an encoder 120 according to one embodiment of the present invention. The encoder 120 includes an encoder stage 122 and a selection stage 124. The encoder 120 couples with at least one external encoded signal source 126 supplying an external encoded signal or transport stream 130, and at least one source 128 supplying an unencoded signal or transport stream 132. The encoder stage 122 receives the unencoded signal 132 and encodes the unencoded signal 132 to generate an internal encoded signal or transport stream 134. Both the external signal 130 and internal signal 134 are supplied to the selection stage 124. The encoder 120 additionally receives an external selection signal 136 that is forwarded to the selection stage 124. The selection stage generates an output signal or transport stream 140 based on one or both of the external and internal signals 130 and 134, respectively, as controlled by the selection signal 136.

In one embodiment, the selection stage 124 is controlled to generate an output 140 base on only one of the input signals. For example, the selection stage can be controlled to receive both the external and internal encoded signals 130, 134, and to pass only the external encoded signal as the output signal 140. Alternatively, the selection stage 124 can be controlled to pass only the internal encoded signal as the output 140. The control allows the selection stage to route the selected input signal(s) to other components of a system in which the encoder 120 is incorporated.

Figure 6:
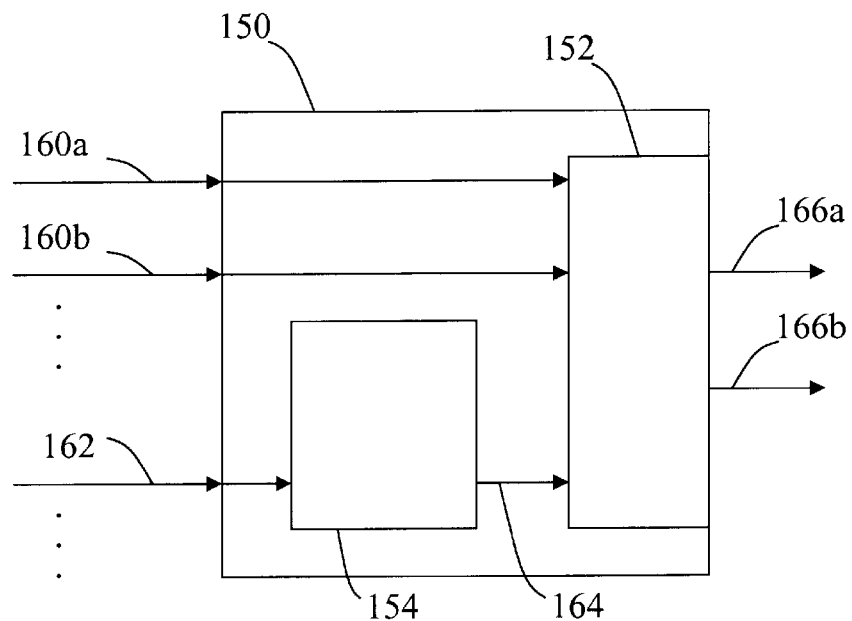
FIG. 6 depicts a simplified block diagram of one implementation of one embodiment of the present invention.

In one embodiment, the encoder of the present invention is configured to receive a plurality of input signals and to generate an output signal based on one or more of the input signals. FIG. 6 depicts a simplified block diagram of an encoder 150 according to one embodiment of the present invention. The encoder 150 is configured to receive two or more external encoded signals or transport streams 160a and 160b, and one or more unencoded signals or transport streams 162. The encoder 150 includes a selection stage 152 and an encoder stage 154. The one or more unencoded signals 162 are forwarded to the encoder stage 154 where the encoder stage encodes the one or more unencoded signals to generate one or more associated internal encoded signals 164.

The selection stage 152 routes the one or more internal encoded signal 164 and/or the external encoded signals 160a–b to be outputted as an output 166 of the encoder 150. The selection stage 152 can be controlled by the encoder 150 or other controls to route only one of the internal encoded signal 164 or external encoded signals 160a–b through as the output 166a. Alternatively, the selection stage 152 can be controlled to generate an output 166a by alternately routing portions of both of the external signals 160a and 160b, resulting in an output signal 166a containing interleaved portions of the external signals. Additionally, the selection stage 152 can be controlled to generate the output 166a by interleaving the internal signal 164 with one or both of the external signals 160a–b. Alternatively, the selection stage 152 can be preprogrammed or have a fixed routing to always generate the same output signal based on the received signals. In one embodiment, the encoder 150 can include a plurality of outputs 166a–b such that the selection stage 152 is cable of routing the input data signal 160 and 162 to more than one output.

Figure 7:
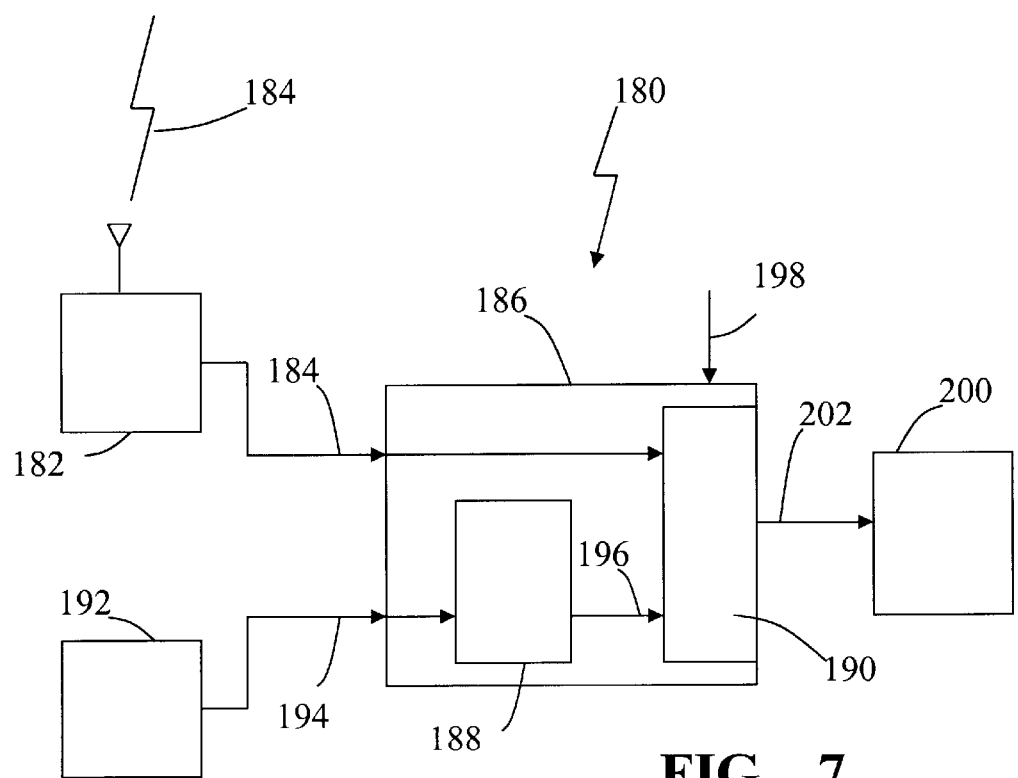
FIG. 7 depicts a system that implements an encoder according to one embodiment of the present invention.

As an example, FIG. 7 depicts a signal processing system 180 that implements an encoder 186 according to one embodiment of the present invention. The system 180 includes a receiver 182 for receiving an encoded transport stream 184, for example, broadcasted from a satellite (not shown). The external transport stream 184 can be substantially any information or data, for example, the external transport stream 184 can be a movie broadcast by the satellite to be received by authorized users for viewing. In one embodiment, the encoder 186 is an MPEG 2 encoder. The encoder 186 includes an encoding stage 188 and a signal selection or routing stage 190. The receiver 182 couples with the encoder 186 and forwards the external transport stream 184 to the encoder. The system 180 further includes a device 192 for generating an external unencoded transport stream 194, such as a handheld video camera or other device providing the unencoded transport stream 194. The device 192 couples with the encoder 186 and supplies the unencoded transport stream 194 to the encoder. The encoding stage 188 encodes the unencoded transport stream and generates an internal encoded transport stream 196 based on the unencoded transport stream 194. Both the satellite transport stream 184 and the internal transport stream 196 are forwarded to the selection stage 190.

The encoder 186 further couples with a disk drive 200 for storing data. The selection stage 190 generates an output transport stream 202 that is forwarded to the disk drive 200 for storing. The selection stage generates the output transport stream based on control or selection signals 198 received from an outside source, such as a user. For example, if the user wants to store the uncompressed transport stream 194 from the device 192 (e.g., a video camera), the user selects the unencoded input be stored. As such, the selection stage routes the internal transport stream 196 as the output 202 to be received by the disk drive 200 for storage. Alternatively, if the user selects to record the external satellite transport stream 184, the selection stage 190 routes the external transport stream out as the output transport stream 202 to be received by the disk drive 200 for storage. Additionally, if the user wanted to store both input transport streams 184 and 194, the selection stage 190 routes both the external transport stream 184 and the internal encoded transport stream 196 to be interleaved as a single interleaved output transport stream 202 that is forwarded to the disk drive 200.

Figure 8:
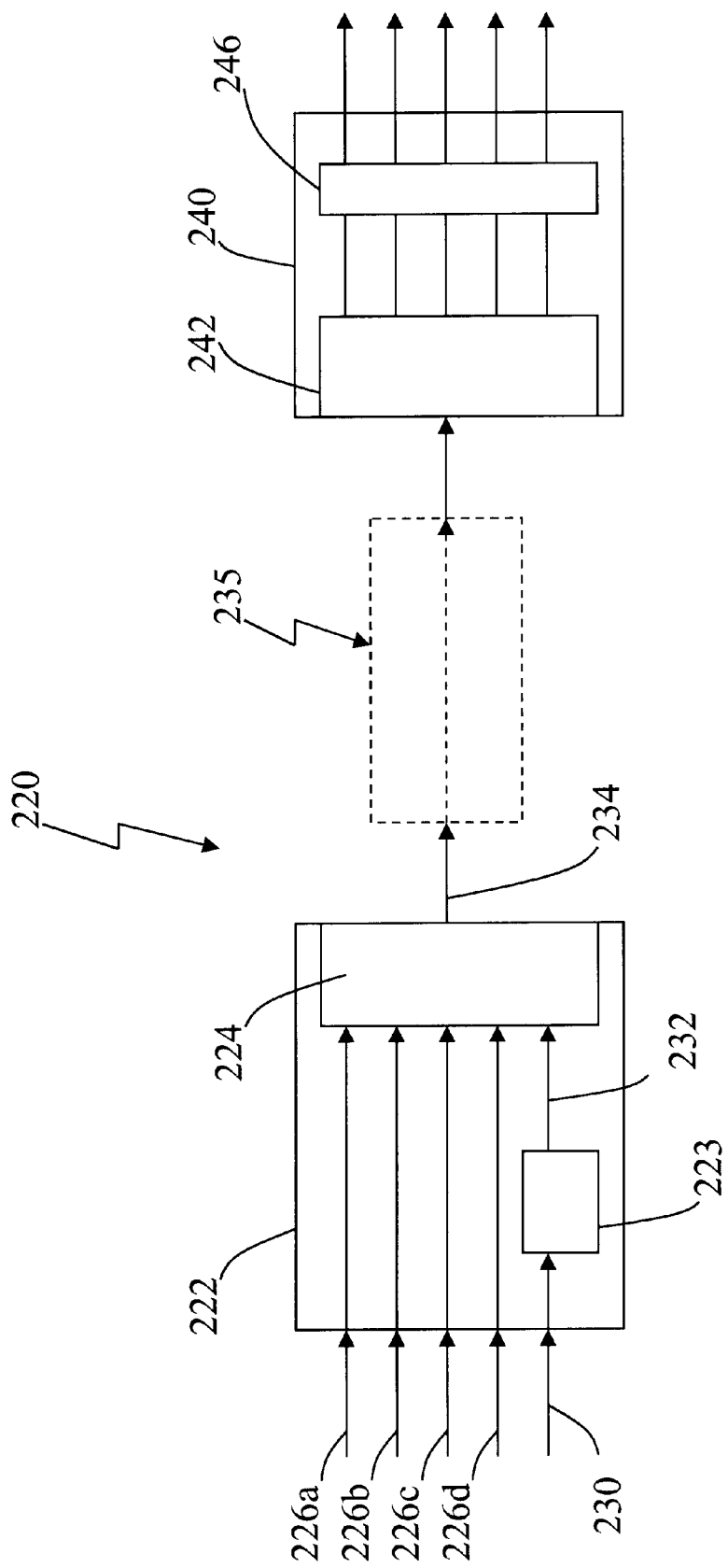
FIG. 8 depicts a system that includes an encoder according to one embodiment of the present invention.

As another example, FIG. 8 depicts a simplified block diagram of a system 220 that includes an encoder 222 according to one embodiment of the present invention. The encoder 222 includes an internal encoding stage 223 and an internal selection stage 224. The encoder 222 receives four external encoded signals 226a–d, where each of the four external encoded signals 226a–d represent, for example, different programming relating to different channels of a television. The encoder 222 additionally receives an external unencoded signal 230, for example a television (TV) broadcast in a NTSC format. The encoder stage 223 received the unencoded signal 120 and encodes the analog signal 230 generating an internal encoded TV broadcast signal 232. The selection stage 224 can be controlled to route each of the five signals 222a–d, 230 to be interleaved into a single transmit signal 234. The transmit signal is transmitted across a channel or medium 235, for example over fiber optic cable, phone lines, twisted wire pair, free space or the like, to be received at a receiver 240. By way of example, the receiver 240 may comprise many different devices, such as a decoder, an MPEG-2 decoder or the like.

In one example, the receiver includes a demultiplexer 242 that extracts and separates each of the five received signals and forwards the signals to a control unit 246. The control unit determines routing of the five received signals. For example, if a user is attempting to watch a specific program relating to the third external signals 226c, then the control unit 246 directs the third signal 226c to be unencoded and uncompressed to be displayed on the user's television. Alternatively, the demultiplexer can be controlled to simply extract only one of the signals, for example only the third external signal 226c.

In one embodiment, the encoder of the present invention is implemented through a single circuit chip with one or more additional inputs for receiving one or more external encoded inputs, for example one or more MPEG 2 transport stream inputs. The new inputs are in addition to one or more inputs for receiving one or more unencoded signals that are to be encoded by the encoder chip. The encoder chip additionally includes a means for selecting or routing the one or more internal transport stream signals and/or the one or more external encoded inputs to generate an output of the MPEG 2 encoder chip. This eliminates many of the problems seen in previous systems arising from multiple transport stream handling.

For example, the present invention allows for fewer wires connecting transport stream data around the system. It allows for flexible selection and routing between the one or more encoded inputs and the internally encoded signals, which does not impact the flexibility of the system. The present inventive encoder avoids the need to include additional external multiplexer chips into circuit board designs reducing the chip count and saving vital circuit board real estate. The present method and apparatus additionally reduce the coupling required between chips, and reduces the amount of routing that must be included within a circuit board design. All of this results in significantly simplified circuit board designs and construction, and thus, reduces the cost of components and circuit board assembly.

The present method and apparatus provide for an encoder, such as an MPEG-2 encoder, that includes an internal selection stage. In one embodiment, the selection stage is implemented though an internal multiplexer. The internal selection stage is capable of selecting and routing one signal to be forwarded as an output or to interleave a plurality of signals to be forwarded as a single output signal. Thus, the present invention avoids the need for an external multiplexer chip within a circuit design. Further, the present invention reduces the number of couplings required between components. Thus, the present invention simplifies circuit designs, reduces costs, simplifies routing considerations and provides additional functional features, such as interleaving of a plurality of signals into a single signal.

The present invention can additionally receive a first transport stream that already includes a plurality of programs or services with audio, video and data already interleaved together. The present invention can interleave this first interleaved transport stream with one or more additional already interleaved signals received by the encoder, and/or with one or more unencoded signals received by the encoder, encoded by the encoder and then interleaved with the already interleaved signal.

While the invention herein disclosed has been described by means of specific embodiments and applications thereof, numerous modifications and variations could be made thereto by those skilled in the art without departing from the scope of the invention set forth in the claims.

What is claimed is:

1. A method of providing an encoded signal with an encoder, comprising the steps of:
   receiving a first external encoded signal with the encoder;
   receiving a first external unencoded signal with the encoder;
   receiving an external selection signal with the encoder;
   encoding the first external unencoded signal with the encoder to generate a first internal encoded signal; and
   internally routing within the encoder one of the first external encoded signal and the first internal encoded signal to an output of the encoder in response to the external selection signal.

2. The method as claimed in claim 1, wherein the step of internally routing further comprises the step of:
   routing only one of the first external encoded signal and the first internal encoded signal.

3. The method as claimed in claim 1, wherein the step of internally routing further comprises the step of:
   interleaving both the first internal encoded signal and the first external encoded signal such that the output includes both the first internal encoded signal and the first external encoded signal.

4. The method as claimed in claim 1, further comprising the step of:
   receiving a second external encoded signal with the encoder;
   receiving a second unencoded signal with the encoder;
   encoding the second unencoded signal with the encoder producing a second internal encoded signal; and
   internally routing within the encoder one of the first external encoded signal, the second external encoded signal, the first internal encoded signal and the second internal encoded signal to the output of the encoder in response to the external selection signal.

5. The method as claimed in claim 4, wherein the step of internally routing further comprises the step of:

interleaving at least two of the first internal encoded signal, the second internal encoded signal, the first external encoded signal and the second external encoded signal to generate the output.

6. The method as claimed in claim 4, wherein the step of internally routing further comprises the step of:

selecting only one of the first internal encoded signal, the second internal encoded signal, the first external encoded signal and the second external encoded signal and routing only the selected signal to the output.

7. An encoder, comprising:

a first input configured to receive a first external encoded signal;

a second input configured to receive a first external unencoded signal;

a selection input configured to receive an external selection signal;

an encoding stage configured to encode the first external unencoded signal to generate a first internal encoded signal; and a selection stage responsive to the external selection signal, wherein the selection stage is configured to internally route within the encoder one of the first external encoded signal and the first internal encoded signal to an output of the encoder.

8. The apparatus as claimed in claim 7, wherein:

the encoder is configured to internally route only one of the first external encoded signal and the first internal encoded signal as the output.

9. The apparatus as claimed in claim 7, further comprising:

a third input configured to receive a second external encoded signal;

a fourth input configured to receive a second unencoded signal;

the encoder stage is configured to encode the second unencoded signal to generate a second internal encoded signal; and the selection stage is configured to internally route the first external encoded signal, the second external encoded signal, the first internal encoded signal and the second internal encoded signal such that at least two of the first external encoded signal, the second external encoded signal, the first internal encoded signal and the second internal encoded signal are interleaved to generate the output.

10. The apparatus as claimed in claim 7, wherein the selection stage is configured to select only one of the first external encoded signal and the first internal encoded signal, and to route the selected one of the first external encoded signal and the first internal encoded signal to the output.

11. The apparatus as claimed in claim 7, further comprising:

a third input configured to receive a second external encoded signal; and the selection stage is configured to receive the first external encoded signal, the second external encoded signal and the first internal encoded signal, and to interleave at least two of the first external encoded signal, the second encoded signal and the first internal encoded signal to generate the output.

12. The apparatus as claimed in claim 7, wherein the encoder is a Moving Picture Experts Group-2 (MPEG-2) encoder.

13. The apparatus as claimed in claim 7, wherein:

the first external encoded signal is in an MPEG transport stream format; and the encoder stage is configured to encode the first unencoded signal to produce the first internal encoded signal in an MPEG transport stream format.

14. An encoder, comprising:

a first input configured to receive a first external encoded signal;

a second input configured to receive a first external unencoded signal;

a selection input configured to receive an external selection signal;

means for encoding the first external unencoded signal to generate a first internal encoded signal; and means responsive to the external selection signal for internally routing within the encoder one of the first external encoded signal and the first internal encoded signal to an output of the encoder.

15. The system as claimed in claim 14, wherein the means for internally routing is configured to select only one of the first internal encoded signal and the first external encoded signal to produce the output including only one of the first internal encoded signal and the first external encoded signal.

16. The system as claimed in claim 14, wherein the means for internally routing is configured to interleave the first internal encoded signal and the first external encoded signal to produce the output including both the first internal encoded signal and the first external encoded signal.

* * * * *